US 8,060,734 B1

(12) United States Patent
Newstadt et al.

(10) Patent No.: US 8,060,734 B1
(45) Date of Patent: Nov. 15, 2011

(54) SYSTEMS AND METHODS FOR PROVIDING RECOMMENDATIONS TO IMPROVE BOOT PERFORMANCE BASED ON COMMUNITY DATA

(75) Inventors: Keith Newstadt, Newton, MA (US); Mark Kennedy, Redondo Beach, CA (US); Matt Boucher, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 548 days.

(21) Appl. No.: 12/250,483

(22) Filed: Oct. 13, 2008

(51) Int. Cl.
*G06F 9/00* (2006.01)
*G06F 9/24* (2006.01)
*G06F 15/177* (2006.01)

(52) U.S. Cl. .......................................................... 713/1
(58) Field of Classification Search .................... 713/1, 2
See application file for complete search history.

(56) References Cited

U.S. PATENT DOCUMENTS 7,275,150 B2 * 9/2007 Pagan ................................ 713/1
2006/0277402 A1 * 12/2006 Wakabayashi .................... 713/1

OTHER PUBLICATIONS

"Startup Manager: Easy Fine-Turning of Your Windows Startup", May 10, 2006, F-Group Software, pp. 1-5.*
"EF System Monitor", Jan. 14, 2006, EF Software, p. 1.*

* cited by examiner

*Primary Examiner* — Thomas Lee
*Assistant Examiner* — Xuxing Chen
(74) *Attorney, Agent, or Firm* — Advantedge Law Group (57) ABSTRACT

An exemplary method for providing recommendations to improve boot performance based on community data is disclosed. In one embodiment, such a method may comprise: 1) identifying at least one startup item on a computing device that is scheduled to run at boot time, 2) requesting startup-recommendation information for the startup item from a server, 3) receiving the startup-recommendation information for the startup item from the server, the startup-recommendation information being based on data gathered from a community of users, and then 4) presenting the startup-recommendation information for the startup item to a user. Corresponding systems and computer-readable media are also disclosed.

20 Claims, 8 Drawing Sheets

| Startup List 400 | |
|---|---|
| Item 406 | Value 408 |
| Processor | X86 Family 6 Model 15 Genuine Intel ~2346 Mhz |
| Local Fixed Disk | NTFS: 120GB (81GB free) |
| Physical Memory | 1.536GB (996.45GB free) |
| Operating System | Microsoft Windows XP Professional, Version 5.1.2600, SP2, Build 2600 |
| Automatic Services | <ul><li>.Net Runtime Optimization Service, v2.0.50727_X86</li><li>DCOM Server Process Launcher</li><li>Remote Procedure Call (RPC) Locator</li><li>. . .</li></ul> |
| Startup Applications | <ul><li>PhotoPro Speed Launch, v3.1</li><li>Media Toolbar Updater, v0.9</li><li>TrialWare Registration Service, v.1.2</li><li>. . .</li></ul> |

402 brackets Processor, Local Fixed Disk, Physical Memory, Operating System
404 brackets Automatic Services, Startup Applications

*FIG. 4*

| Startup item 502 | Percentage of users with item in boot sequence 504 | Percentage of users that have removed item from boot sequence 506 | Percentage of users that have removed, but then restored, item to boot sequence 508 | Remove item from boot sequence 510 |
|---|---|---|---|---|
| DCOM Server Process Launcher | 94% | 6% | 19% | ☐ |
| PhotoPro Speed Launch | 33% | 8% | 2% | ☐ |
| Media Toolbar Updater | 8% | 39% | 1% | ☑ |

User Interface 500

SYSTEMS AND METHODS FOR PROVIDING RECOMMENDATIONS TO IMPROVE BOOT PERFORMANCE BASED ON COMMUNITY DATA

BACKGROUND

The amount of time required to boot a computing device depends, to a large degree, on the number of startup items (such as startup applications and automatic services) in the boot sequence of the computing device. Some conventional startup manager programs attempt to improve the boot performance of a computing device by presenting, and then allowing a user to disable, startup items in the boot sequence of the computing device. However, conventional startup manager programs fail to provide any guidance on which startup items the user should disable. As such, the instant disclosure identifies a need for systems and methods for obtaining and then presenting information to a user that may be helpful in determining whether to remove a startup item from a computing device's boot sequence.

SUMMARY

As will be described in greater detail below, the instant disclosure generally relates to systems and methods for obtaining and then presenting information to a user that may be helpful in determining whether to remove a startup item from a computing device's boot sequence. In one example, such a system may comprise: 1) a data-collection module programmed to identify at least one startup item (such as a startup application or service) on a computing device that is scheduled to run at boot time, 2) a communication module programmed to request and receive startup-recommendation information for the startup item from a server, and 3) a startup-manager module programmed to present the startup-recommendation information to a user of the computing device.

As will be described in greater detail below, the startup-recommendation information may be based on information gathered from a community of users and may help a user determine whether to remove startup items from the boot sequence of his/her computing device. For example, startup-recommendation information may identify: 1) a percentage of users within a community of users that have the startup item in their boot sequence (which percentage may be useful in determining whether the startup item is required for proper operation of the user's operating system or installed software), 2) a percentage of users within the community that have removed the startup item from their boot sequence (which percentage may be helpful in determining whether the startup item performs a useful or desirable function), and/or 3) a percentage of users within the community that, after previously removing the startup item from their boot sequence, have restored the startup item to their boot sequence (which percentage may again be useful in determining whether the item is required for proper operation of the user's operating system or installed software).

In certain embodiments, the startup-manager module may present the startup-recommendation information in a graphical user interface. This graphical user interface may display: 1) raw percentages for each category (e.g., "39% of users have removed this startup item from their boot sequence"), 2) simple recommendations for the startup item (such as "required," "not required," "desirable," and/or "not desirable"), each of which may be based on some pre-defined threshold (e.g., if a startup item is present in the boot sequence of over 90% of users within the community, then the startup item may be "required"), and/or 3) combinations of the same. Similarly, the graphical user interface may use symbols, shapes, colors, graphs, charts, or the like to indicate whether a startup item is, for example, "required," "not required," "desirable," and/or "not desirable."

After reviewing the startup-recommendation information, a user may remove startup items from, or restore startup items to, his/her boot sequence by interacting with the graphical user interface. In one example, the data-collection module may monitor any changes made by a user to his/her boot sequence and then cause the communication module to report such changes to the server. This information, in combination with similar information received from additional computing devices, may then serve as the basis for future startup-recommendation information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure generally relates to systems and methods for obtaining and then presenting information to a user that may be helpful in determining whether to remove a startup item from a computing device's boot sequence. The phrase "startup item," as used herein, generally refers to any application, service, or other computer-readable instruction on a computing device that is scheduled to launch or run at boot time. Examples of startup items include, without limitation, automatic services, startup folder items, and any other application or service in a computing device's boot sequence.

Figure 1:
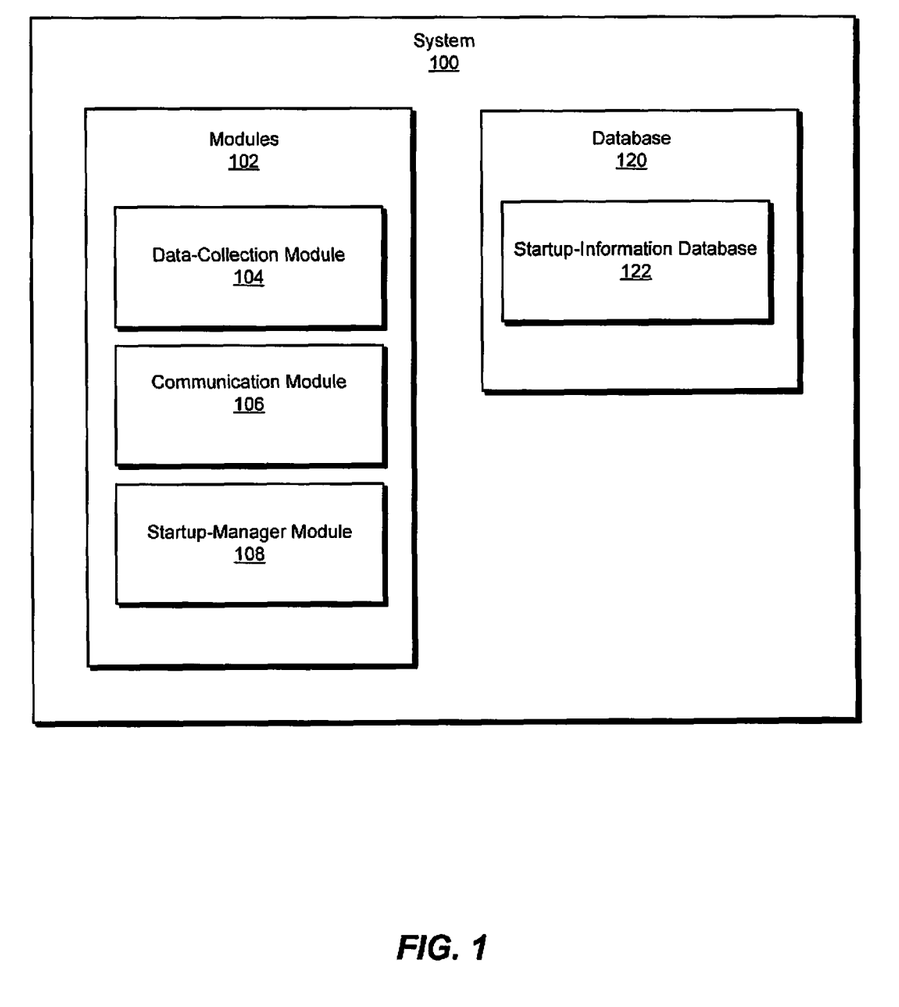
FIG. 1 is a block diagram of an exemplary system for providing recommendations for improving the boot performance of a computing device based on data gathered from a community of users according to at least one embodiment.
Figure 2:
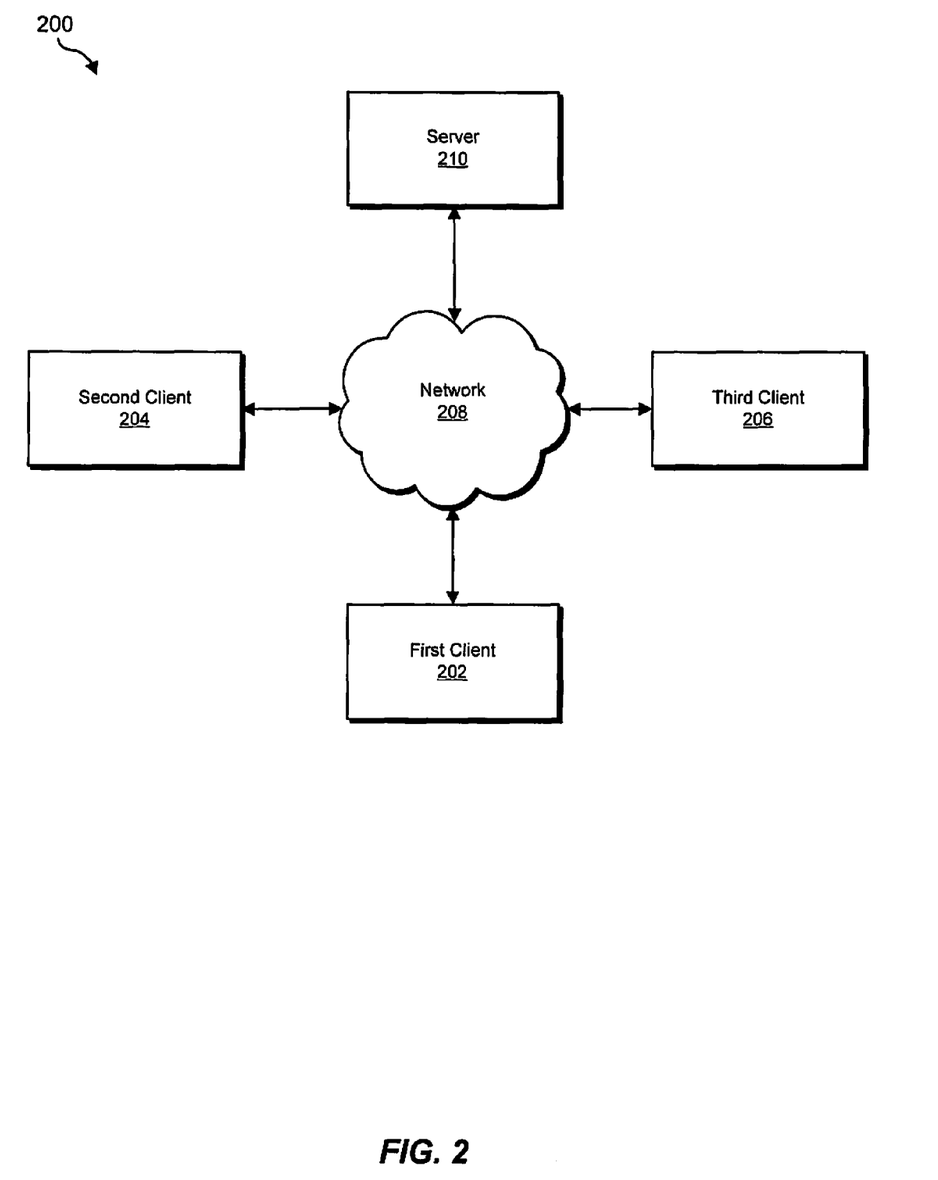
FIG. 2 is a block diagram of an exemplary system for providing recommendations for improving the boot performance of a computing device based on data gathered from a community of users according to an additional embodiment.

The following will provide, with reference to FIGS. 1-2, detailed descriptions of exemplary systems for providing recommendations for improving the boot performance of a computing device based on data gathered from a community of users. Detailed descriptions of corresponding exemplary computer-implemented methods will also be provided with reference to FIGS. 3-6. In addition, descriptions of an exemplary computing system and network architecture capable of implementing one or more of the embodiments described and/or illustrated herein will also be provided in connection with FIGS. 7 and 8.

FIG. 1 is a block diagram of an exemplary system 100 for providing recommendations for improving the boot performance of a computing device based on data gathered from a community of users. As illustrated in this figure, exemplary system 100 may comprise one or more modules 102 for performing one or more tasks. For example, exemplary system 100 may comprise a data-collection module 104 for collecting information about startup items that are scheduled to run a computing device. Exemplary system 100 may also comprise a communication module 106 for facilitating communication of information about startup items between a client-side computing device (such as clients 202, 204, and 206 in FIG. 2) and a server-side computing device (such as server 210 in FIG. 2). In addition, as will be explained in greater detail below, exemplary system 100 may comprise a startup-manager module 108 for presenting information to a user that may be helpful in determining whether to remove a startup item from a computing device's boot sequence. Although not illustrated in FIG. 1, exemplary system 100 may also comprise one or more additional modules.

In certain embodiments, one or more of modules 102 in FIG. 1 may represent one or more software applications or programs that, when executed by a computing device, may cause the computing device to perform one or more tasks required to provide community-based information that may be used to improve the boot performance of a computing device. For example, as will be described in greater detail below, one or more of modules 102 may represent software modules configured to run on one or more computing devices, such as the devices of system 200 in FIG. 2 (e.g., clients 202, 204, and 206 and server 210), computing system 710 in FIG. 7, and/or portions of exemplary network architecture 800 in FIG. 8. One or more modules 102 in FIG. 1 may also represent all or portions of one or more special-purpose computers configured to perform one or more tasks.

As illustrated in FIG. 1, exemplary system 100 may also comprise one or more databases 120. Databases 120 may represent portions of a single database or computing device or a plurality of databases or computing devices. In one embodiment, exemplary system 100 may comprise a startup-information database 122 for storing information collected from computing devices that may be used to determine whether to remove a startup item from a computing device's boot sequence.

One or more of databases 120 in FIG. 1 may represent a portion of one or more computing devices. For example, one or more of databases 120 may represent a portion of one or more of the devices in FIG. 2, computing system 710 in FIG. 7, and/or portions of exemplary network architecture 800 in FIG. 8. Alternatively, one or more of databases 120 in FIG. 1 may represent one or more physically separate devices capable of being accessed by a computing device, such as the devices in FIG. 2, computing system 710 in FIG. 7, and/or portions of exemplary network architecture 800 in FIG. 8.

Exemplary system 100 in FIG. 1 may be deployed in a variety of ways. In one example, system 100 may be deployed within a networked system. FIG. 2 is a block diagram of an exemplary networked system 200 in which system 100 in FIG. 1 may be deployed. As illustrated in this figure, exemplary system 200 may comprise a first client 202, a second client 204, and a third client 206 in communication with a server 210 via a network 208. In at least one embodiment, and as will be described in greater detail below, server 210 may receive (via network 208) information from clients 202, 204, and 206 that may be helpful in determining whether to remove a startup item from a computing device's boot sequence.

First, second, and third clients 202, 204, and 206 generally represent any type or form of client-side computing device. Examples of clients 202, 204, and 206 include, without limitation, laptops, desktops, cellular phones, personal digital assistants (PDAs), multimedia players, embedded systems, combinations of one or more of the same, or any other suitable computing device. Similarly, server 210 generally represents any type or form of server-side computing device.

Network 208 generally represents any medium capable of facilitating communication or data transfer. Examples of network 208 include, without limitation, an intranet, a wide area network (WAN), a local area network (LAN), a personal area network (PAN), the Internet, power line communications (PLC), a cellular network (e.g., GSM network), or the like. Network 208 may facilitate communication or data transfer using wireless or wired connections.

As mentioned above, one or more of modules 102 in FIG. 2 may be stored and configured to run on server 210 and/or clients 202, 204, and 206 in FIG. 2. Furthermore, one or more of modules 102 may be shared between server 210 and/or clients 202, 204, and 206, meaning that the same module may be configured to operate simultaneously on separate devices for a single purpose. In both cases, and as will be described in greater detail below, modules 102 may enable server 210 and/or clients 202, 204, and 206 to present information to a user that may be helpful in determining whether to remove a startup item from a computing device's boot sequence.

Figure 3:
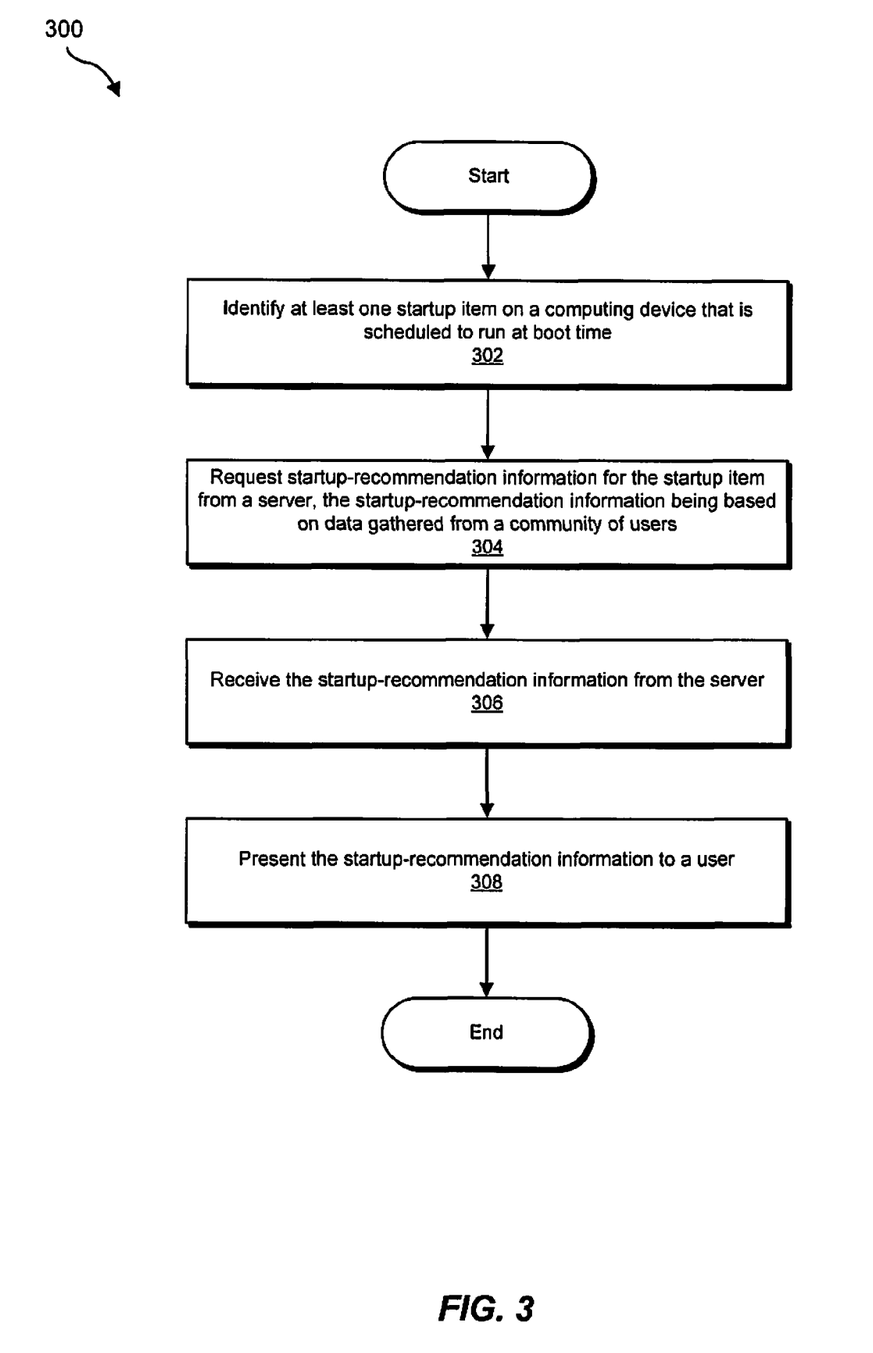
FIG. 3 is a flow diagram of an exemplary method for providing recommendations for improving the boot performance of a computing device based on data gathered from a community of users.

FIG. 3 is a flow diagram of an exemplary method 300 for presenting information to a user that may be helpful in determining whether to remove a startup item from a computing device's boot sequence. As illustrated in this figure, at step 302 the system may identify at least one startup item on a computing device that is scheduled to run at boot time. For example, data-collection module 104 in FIG. 1 (which may, as detailed above, be stored and configured to run on first client 202 in FIG. 2) may identify at least one startup item on first client 202 that is scheduled to run at boot time (i.e., at least one startup item that is in the boot sequence of first client 202).

Step 302 may be performed in a variety of ways. In certain embodiments, data-collection module 104 in FIG. 1 may perform step 302 by: 1) identifying each startup item on first client 202 in FIG. 2 that is scheduled to run at boot time and then 2) creating a startup list that identifies each of these startup items. Communication module 106 in FIG. 1 may then cause first client 202 to transmit this startup list to a server, such as server 210 in FIG. 2.

Figure 4:
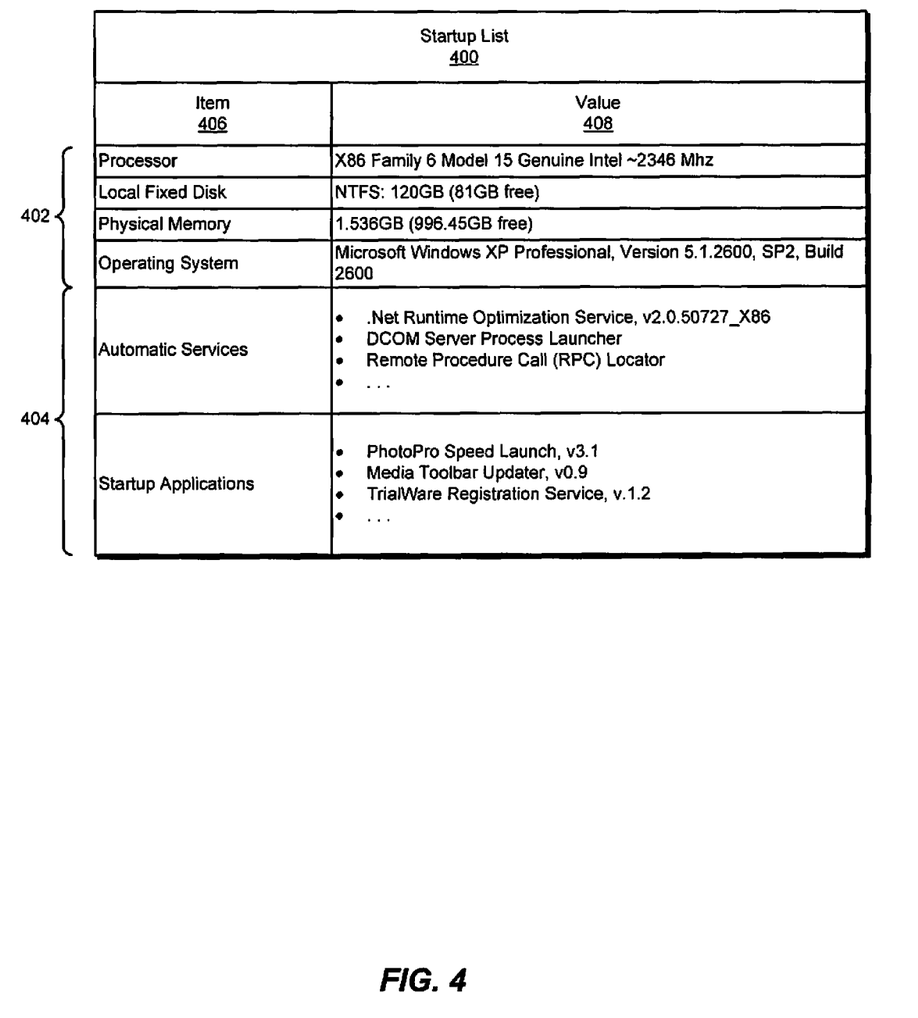
FIG. 4 is a block diagram of an exemplary startup list that identifies each startup item on a computing device that is scheduled to run at boot time.

FIG. 4 provides an illustration of an exemplary startup list 400 for a computing system. As illustrated in this figure, startup list 400 may comprise a system profile 402 that identifies one or more hardware and software characteristics of the computing system and a startup profile 404 that identifies one or more startup items on the computing device that are scheduled to run or launch at boot time.

Examples of hardware characteristics that may be identified in system profile 402 include, without limitation, the characteristics of one or more processors of a computing system, the characteristics of one or more remote or local discs of a computing system, the characteristics of physical or virtual memory of a computing system, the page-file space of a computing system, or any other potentially useful information. Similarly, examples of software characteristics that may be identified in system profile 402 include, without limitation, operating-system information, service-pack information, driver information, Internet-browser information, security-settings information, application-software information, or any other potentially useful information.

Startup lists, such as startup list 400 in FIG. 4, may be generated or created in a variety of ways. For example, in WINDOWS systems, the command MSINFO32.exe may be used to generate a startup list that identifies both characteristics of a computing system and each startup item on the computing system that is scheduled to run at boot time. In this example, unnecessary or duplicative information (e.g., user-specific information) may be removed from the list generated using the MSINFO32.exe command.

In at least one embodiment, system profile 402 may contain a unique identifier for the computing system and/or for each startup item on the computing system. The phrase "unique identifier," as used herein, generally refers to any type or form of identifier that may be used to identify a computing system or a startup item. Examples of unique identifiers include, without limitation, MAC addresses, serial numbers, hashes, checksums, activation keys, license keys, tokens, or any other item that may be used to identify a computing system or startup item.

Returning to FIG. 3, at step 304 the system may request startup-recommendation information for the startup item identified in step 302 from a server. For example, communication module 106 in FIG. 1 may cause first client 202 in FIG. 2 to transmit, via network 208, a request to server 210 for startup-recommendation information for the startup item identified in step 302.

As used herein, the phrase "startup-recommendation information" generally refers to information gathered from a community of users that may help a user determine whether to remove a startup item from a computing device's boot sequence. In certain embodiments, and as will be described in greater detail below, startup-recommendation information may identify: 1) a percentage of users within a community of users that have the startup item in their boot sequence, 2) a percentage of users within the community that have removed the startup item from their boot sequence, and/or 3) a percentage of users within the community that, after previously removing the startup item from their boot sequence, have restored the startup item to their boot sequence.

The above-identified categories of information may help a user determine whether to remove a startup item from his/her boot sequence by indicating whether the startup item is required, not required, desirable, and/or not desirable. For example, if a high percentage of users (e.g., 94%) within a community have the startup item in their boot sequence, this may indicate that the startup item is required by an operating system for proper operation. In this example, the startup item may represent an operating-system service (such as the DCOM Server Process Launcher service in WINDOWS) that is required for proper operation of the operating system. Conversely, if a relatively low percentage of users (e.g., 8%) within the community do not have the startup item in their boot sequence, then this may indicate that the startup item is not required for proper operation of the operating system.

Similarly, if a relatively high percentage of users (e.g., 39%) within the community have removed the startup item from their boot sequence, this may indicate that the startup item is undesirable. For example, the startup item may represent a program (such as a usage-reporting program, a registration program, or the like) that has relatively little utility. Conversely, if a relatively low percentage of users (e.g., 8%) within the community have removed the startup item from their boot sequence, this may indicate that the startup item may be desirable. For example, the startup item may represent a backup utility or the like that serves a useful and desirable function.

In addition, if a relatively high percentage of users (e.g., 19%) within the community have, after previously removing the startup item from their boot sequence, restored the startup item to their boot sequence, this may indicate that the startup item is required and/or desirable. For example, a user may remove a startup service, only to discover that the service is required for proper operation of the operating system. In this case, the user may restore the startup item to the user's boot sequence.

Returning to FIG. 3, at step 306 the system may receive the requested startup-recommendation from the server. For example, communication module 106 in FIG. 1 (which, as detailed above, may be stored and configured to run on first client 202 in FIG. 2) may receive startup-recommendation information for the startup item identified in step 302 from server 210 via network 208. In certain embodiments, the startup-recommendation information received from server 210 may be based on information gathered from computing devices having characteristics that are similar to first client 202. For example, as will be described in greater detail below, server 210 may generate, and then transmit to first client 202, startup-recommendation information that is based on information gathered from computing devices having the same operating system, the same operating-system service pack, and/or substantially similar hardware components as first client 202.

At step 308, the system may present the startup-recommendation information for the startup item to a user. For example, startup-manager module 108 in FIG. 1 (which may, as detailed above, be stored and configured to run on first client 202 in FIG. 2) may present the startup-recommendation information for the startup item identified in step 302 to a user of first client 202. Upon completion of step 308, exemplary method 300 may terminate.

Figure 5:
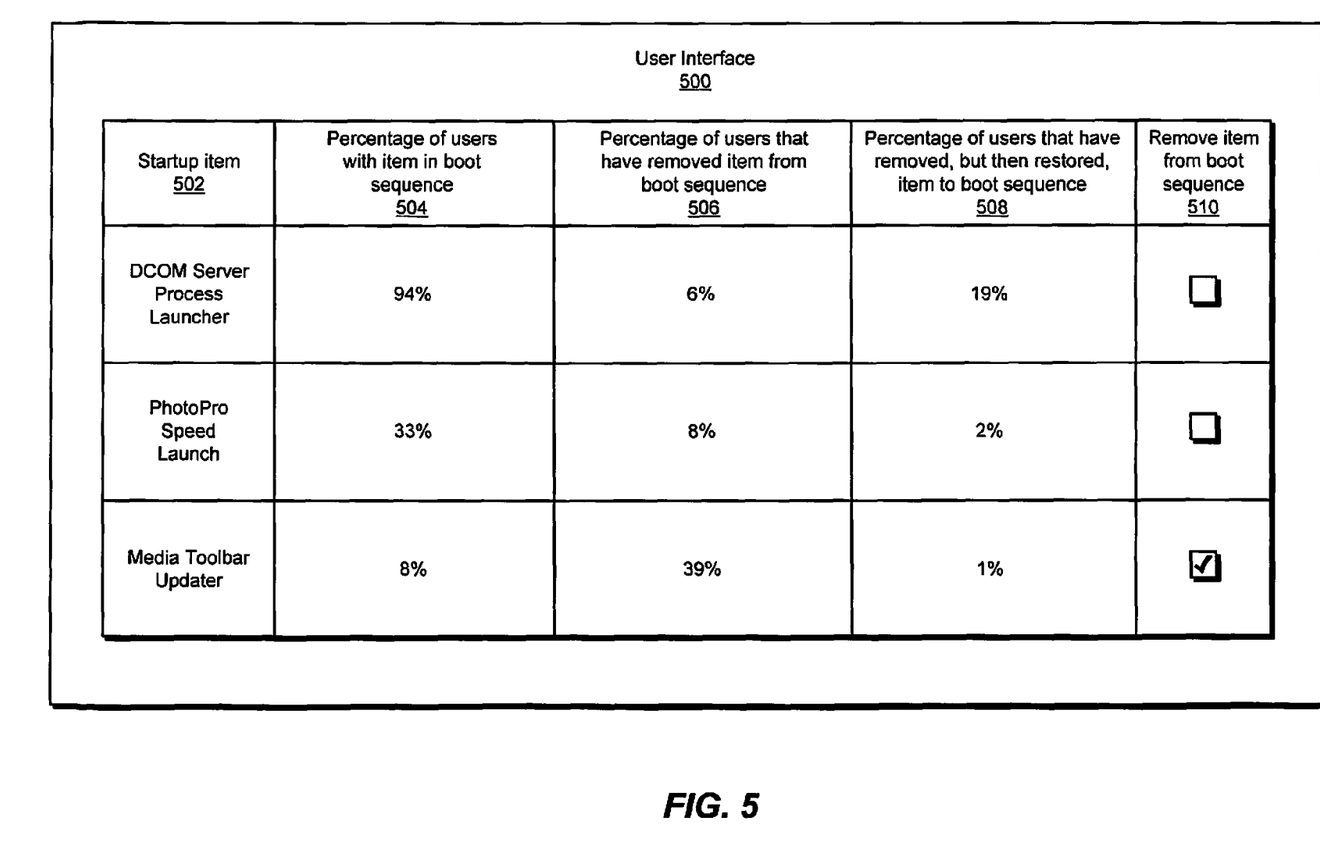
FIG. 5 is a block diagram of an exemplary graphical user interface for displaying startup-recommendation information for a computing device.

The system may perform step 308 in a variety of ways. In one example, the system may display the startup-recommendation information using a graphical user interface. For example, startup-manager module 108 in FIG. 1 may provide a user interface, such as exemplary user interface 500 in FIG. 5, for displaying startup-recommendation information for one or more startup items to a user. As illustrated in FIG. 5, user interface 500 may display: 1) one or more startup items (column 502), 2) the percentage of users within the community that have the startup item in their boot sequence (column 504), 3) the percentage of users within the community that have removed the startup item from their boot sequence (column 506), and/or 4) the percentage of users within the community that, after previously removing the startup item from their boot sequence, have restored the startup item to their boot sequence (column 508).

As detailed above, the startup-recommendation information displayed in user interface 500 may help a user determine whether to remove a startup item from his/her boot sequence by indicating whether the startup item is required, not required, desirable, or not desirable. For example, for the startup item "DCOM Server Process Launcher" in FIG. 5, the high percentage of users (94%) within the community that have the startup item in their boot sequence may indicate that this startup item is required by the user's operating system for proper operation. In addition, the relatively high percentage of users (19%) within the community that have, after previously removing the startup item "DCOM Server Process Launcher" from their boot sequence, restored this startup item to their boot sequence, may also indicate that this startup item is required and/or desirable.

Conversely, for the startup item "Media Toolbar Updater," the relatively low percentage of users (8%) within the community that do not have this startup item in their boot sequence may indicate that the startup item is not required for proper operation of the user's operating system. In addition, the relatively high percentage of users (39%) within the community that have removed this startup item from their boot sequence may indicate that the startup item is undesirable. For example, "Media Toolbar Updater" may consume inordinate system resource or provide relatively little utility to users.

For the startup item "PhotoPro Speed Launch," the relatively low percentage of users (8%) within the community that have removed the startup item from their boot sequence may indicate that the startup item may be desirable. For example, "PhotoPro Speed Launch" may allow users to quickly launch a specific program, thereby serving a useful and desired function.

Exemplary user interface 500 generally represents any type or form of user interface. Examples of user interface 500 include, without limitation, a client-based GUI, a web browser configured to transmit and receive data from a web server, or any other form of user interface.

User interface 500 may display startup-recommendation information in a variety of ways. For example, user interface 500 may display text-based recommendation information, graphics-based recommendation information, and/or a combination of the same. In the case of text-based recommendation information, user interface 500 may display: 1) raw percentages for each category (e.g., "39% of users have removed this startup item from their boot sequence"), 2) simple recommendations for the startup item (such as "required," "not required," "desirable," and/or "not desirable"), each of which may be based on some pre-defined threshold (e.g., if a startup item is present in the boot sequence of over 90% of users, then the startup item may be "required," or if less than 10% of users have removed a startup item from their boot sequence, than the item may be "desirable"), and/or 3) combinations of the same. Similarly, graphics-based recommendations may use symbols, shapes, colors, graphs, charts, or the like to indicate whether a startup item is, for example, "required," "not required," "desirable," and/or "not desirable."

Although not illustrated in FIG. 3, exemplary method 300 may also comprise receiving: 1) a user-generated request to remove at least one startup item from the computing device's boot sequence and/or 2) a user-generated request to restore at least one previously removed startup item to the computing device's boot sequence. For example, after reviewing the startup-recommendation information displayed in user interface 500, a user may remove one or more startup items from his/her boot sequence by selecting user-selectable objects 510. Similarly, a user may restore a previously removed startup item to his/her boot sequence by un-checking one of user-selectable objects 510.

In certain embodiments, the system may monitor any changes made by a user to his/her boot sequence and then report information regarding any such changes to a central server. For example, data-collection module 104 in FIG. 1 may monitor a user's startup list (such as startup list 400 in FIG. 4). If data-collection module 104 detects a change to startup list 400 (e.g., if data-collection module 104 determines that a startup item has been added or removed from startup list 400), then communication module 106 may transmit information that details these changes to server 210 in FIG. 2. Server 210 may then use this information to generate future startup-recommendation information for startup items, as will be explained below.

Figure 6:
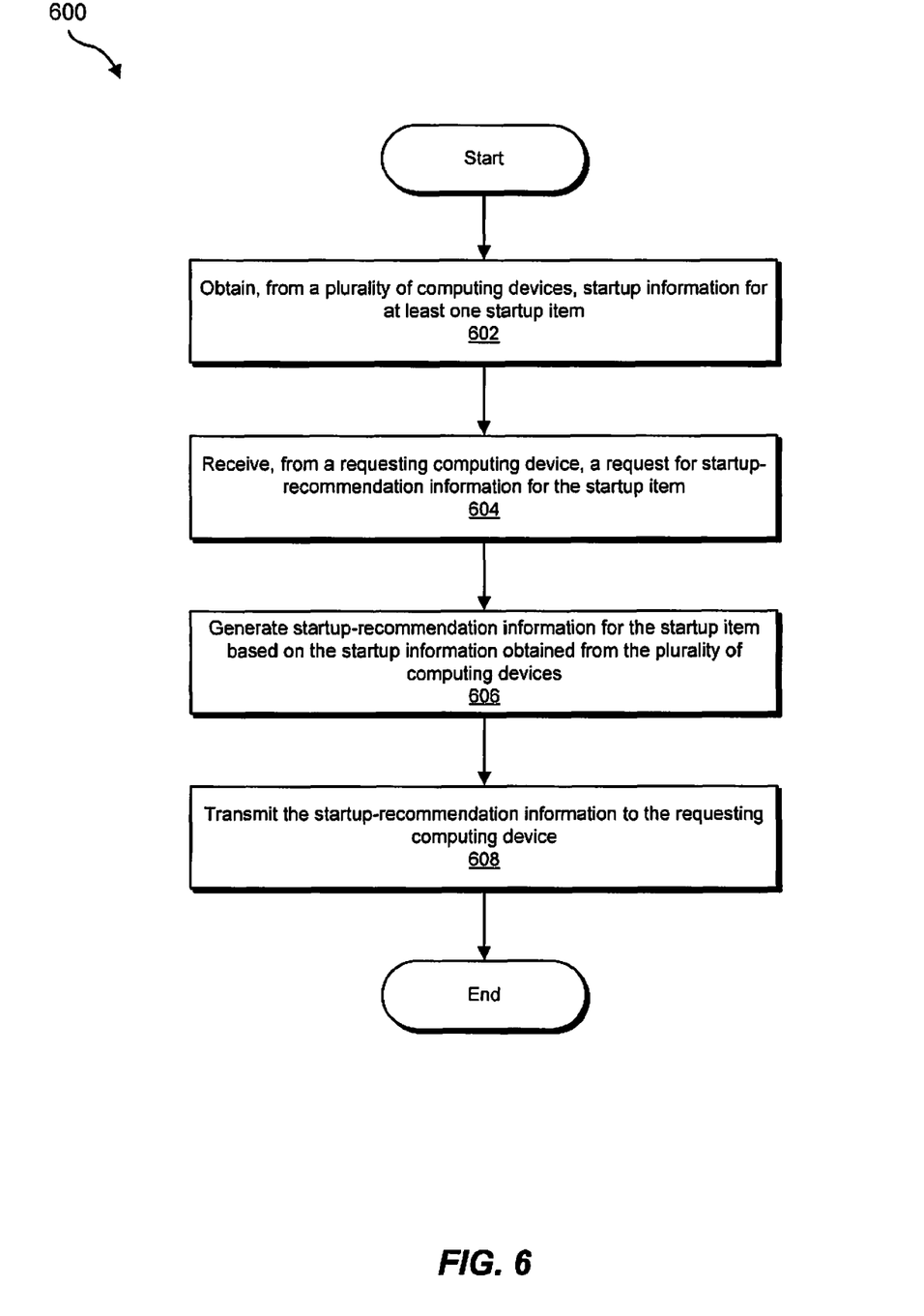
FIG. 6 is a flow diagram of an exemplary method for providing recommendations for improving the boot performance of a computing device based on data gathered from a community of users according to at least one embodiment.

As suggested above, a centralized server may generate startup-recommendation information for startup items based on information gathered or received from a community of users. FIG. 6 is flow diagram of an exemplary server-side method 600 for generating startup-recommendation information for startup items. As illustrated in this figure, at step 602 the system may obtain, from a plurality of computing devices, startup information for at least one startup item. For example, server 210 in FIG. 2 may receive startup lists (such as startup list 400 in FIG. 4) and/or information detailing changes to such lists from second client 204 and third client 206. In certain embodiments, server 210 may store this information in startup-information database 122 in FIG. 1.

At step 604, the system may receive, from a requesting computing device, a request for startup-recommendation information for at least one startup item. For example, server 210 may receive a request from first client 202 for startup-recommendation information for the startup item "DCOM Server Process Launcher."

At step 606, the system may generate the requested startup-recommendation information for the startup item based on the startup information received in step 602. For example, server 210 may determine, by analyzing the startup lists received from second and third clients 204 and 206 in step 602: 1) the percentage of users within the community (in this case, second client 204 and third client 206) that have the startup item "DCOM Server Process Launcher" in their boot sequence, 2) the percentage of users within the community that have removed this startup item from their boot sequence, and/or 3) the percentage of users within the community that, after previously removing this startup item from their boot sequence, have restored this startup item to their boot sequence.

In certain embodiments, the system may generate startup-recommendation information that is based on information gathered from computing devices having characteristics that are similar to the requesting computing device. For example, a server may generate, and then transmit to a requesting computing device, startup-recommendation information that is based on information gathered from computing devices having the same operating system, the same operating-system service pack, and/or substantially similar hardware components as the requesting computing device.

At step 608, the system may transmit the requested startup-recommendation information for the startup item to the requesting computing device. For example, communication module 108 in FIG. 1 may cause server 210 in FIG. 2 to transmit the startup-recommendation information it generated for the startup item "DCOM Server Process Launcher" to first client 202 via network 208. Upon completion of step 608, exemplary method 600 may terminate.

The system may perform step 608 in a variety of ways. In one example, communication module 108 in FIG. 1 may cause server 210 in FIG. 2 to transmit the requested startup recommendation information in a format that is configured to be displayed in a client-based GUI. In an additional embodiment, communication module 108 in FIG. 1 may cause server 210 in FIG. 2 to transmit the requested startup recommendation information in a format that is capable of being displayed in a client-side web browser.

As detailed above, the exemplary systems and methods described herein may gather and then present information that may help a user determine whether to remove a startup item from his/her computing device's boot sequence. This information may enable a user to improve the boot performance of his/her computing device without fear of causing unexpected problems.

Figure 7:
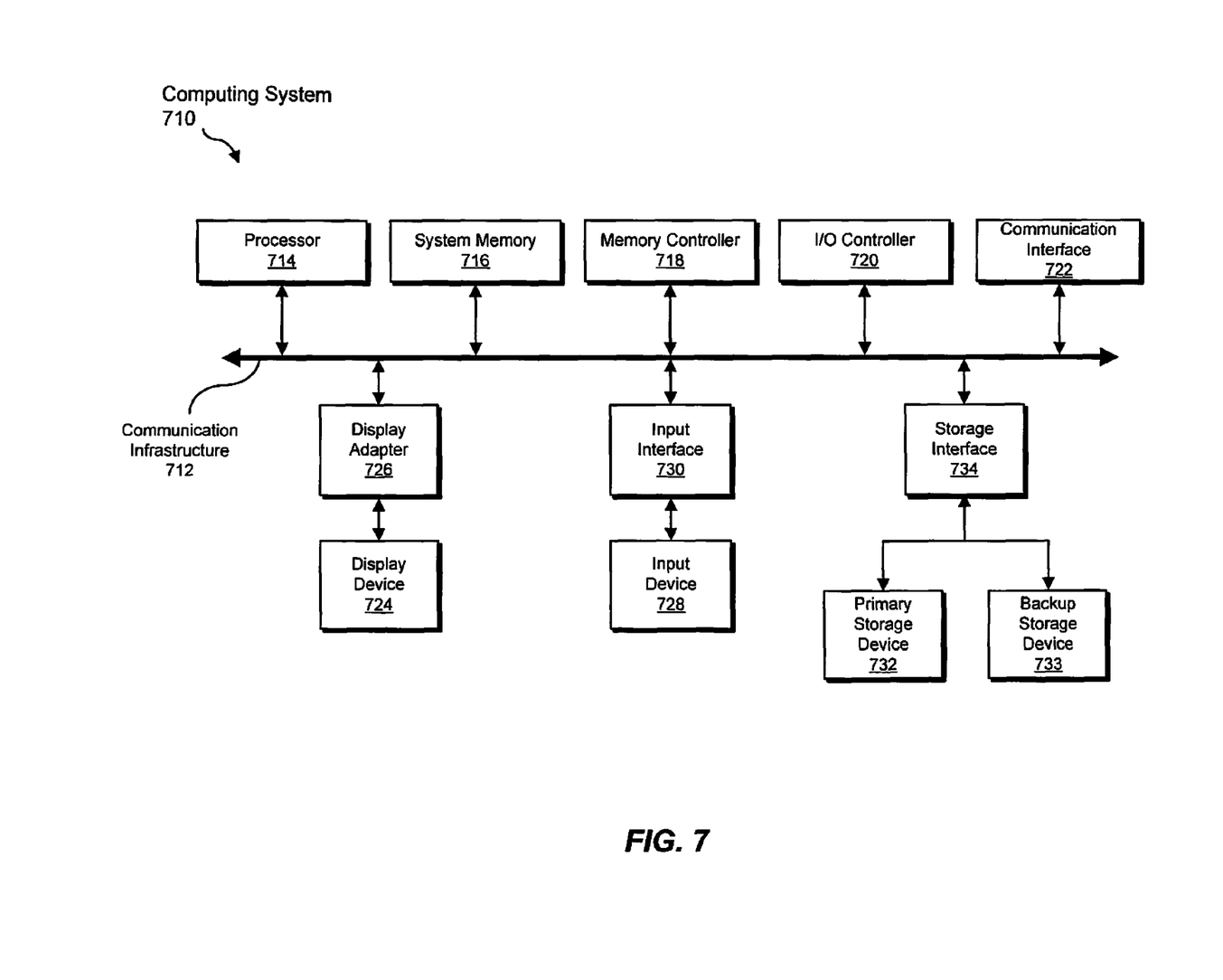
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, requesting, receiving, presenting, displaying, creating, transmitting, detecting, obtaining, and generating steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as identifying, requesting, receiving, presenting, displaying, creating, transmitting, detecting, obtaining, and generating.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, requesting, receiving, presenting, displaying, creating, transmitting, detecting, obtaining, and generating steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 794 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, requesting, receiving, presenting, displaying, creating, transmitting, detecting, obtaining, and generating steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, requesting, receiving, presenting, displaying, creating, transmitting, detecting, obtaining, and generating steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the identifying, requesting, receiving, presenting, displaying, creating, transmitting, detecting, obtaining, and generating steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
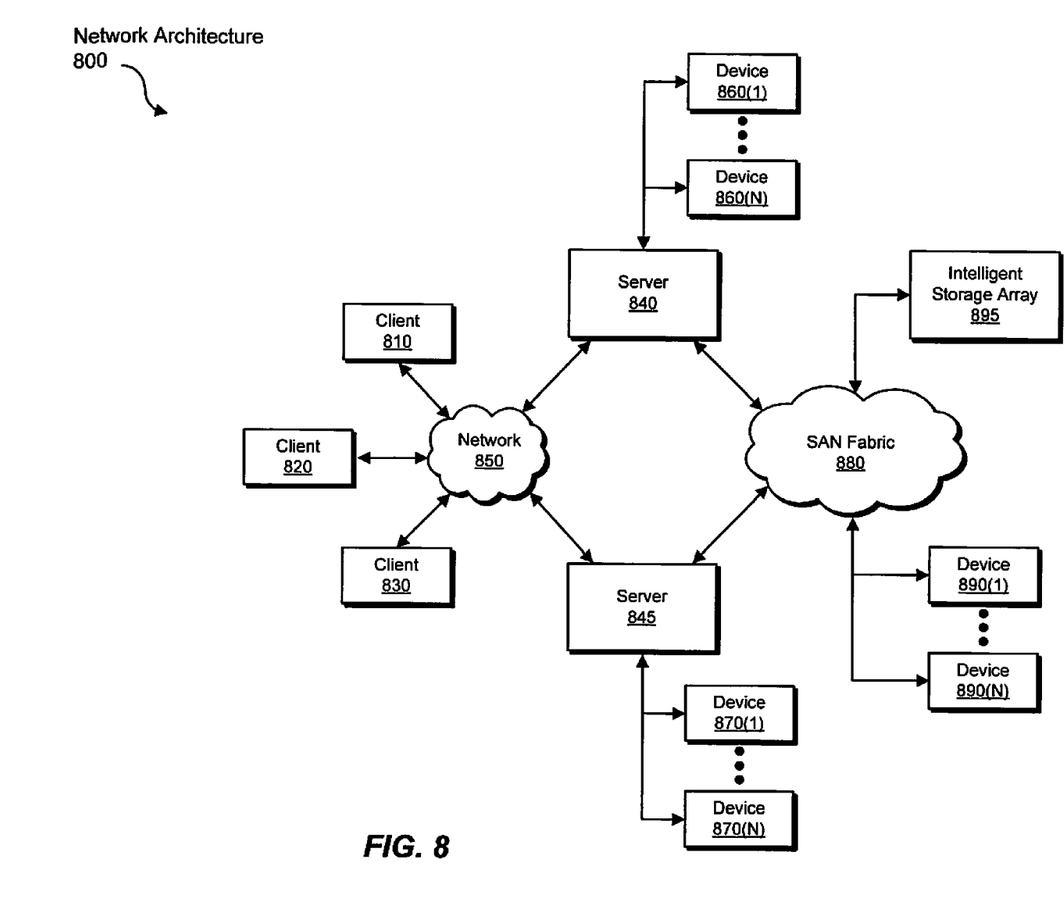
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, requesting, receiving, presenting, displaying, creating, transmitting, detecting, obtaining, and generating steps disclosed herein. Network architecture 800 may also be used to perform and/or be a means for performing other steps and features set forth in the instant disclosure.

As detailed above, one or more of the systems described herein may perform and/or be a means for performing either alone or in combination with other elements, one or more of the exemplary methods described and/or illustrated herein. For example, the systems described herein may perform a method for providing recommendations to improve boot performance based on community data that comprise: 1) identifying at least one startup item (such as a startup application or service) on a computing device that is scheduled to run at boot time, 2) requesting startup-recommendation information for the startup item from a server, 3) receiving the startup-recommendation information for the startup item from the server, the startup-recommendation information being based on data gathered from a community of users, and then 4) presenting the startup-recommendation information for the startup item to a user.

In certain embodiments, presenting the startup-recommendation information may comprise displaying the startup-recommendation information in a graphical user interface. The graphical user interface may display graphics-based and/or text-based recommendation information for the startup item. In one example, the graphical user interface may display: 1) a percentage of users within the community that have the startup item in their boot sequence, 2) a percentage of users within the community that have removed the startup item from their boot sequence, and/or 3) a percentage of users within the community that, after previously removing the startup item from their boot sequence, have restored the startup item to their boot sequence.

The method may also comprise receiving, via the graphical user interface a user-generated request to remove at least one startup item from the computing device's boot sequence and/or a user-generated request to restore at least one previously removed startup item to the computing device's boot sequence.

In one example, the system may identify at least one startup item on the computing device that is scheduled to run at boot time by: 1) identifying each startup item on the computing device that is scheduled to run at boot time and then 2) creating a startup list that identifies each startup item on the computing device that is scheduled to run at boot time. The startup list may comprise a unique identifier for the computing device and/or a unique identifier for each startup item and may identify an operating system of the computing device and/or an operating-system service pack of the computing device.

In one example, the method may further comprise transmitting the startup list to the server. The method may also comprise detecting changes to the startup list and then transmitting information that details the changes to the startup list to the server. In certain examples, the community may comprise computing devices having a common operating system, a common operating-system service pack, and/or substantially similar hardware components.

The systems described and/or illustrated herein may also perform a computer-implemented method for providing recommendations to improve boot performance based on community data. Such a method may comprise: 1) obtaining, from a plurality of computing devices, startup information for at least one startup item that is typically scheduled to run at boot time, 2) receiving, from a requesting computing device, a request for startup-recommendation information for the startup item, 3) generating the startup-recommendation information for the startup item based on the startup information obtained from the plurality of computing devices, and then 4) transmitting the startup-recommendation information to the requesting computing device.

In certain embodiments, obtaining the startup information for the startup item may comprise receiving, from each of the plurality of computing devices, a startup list that identifies each startup item that is scheduled to run at boot time. Obtaining the startup information for the startup item may also comprise receiving, from at least one of the plurality of computing devices, information that details any changes to the startup list.

The startup-recommendation information may identify: 1) a percentage of computing devices within the plurality of computing devices that have the first startup item in their boot sequence, 2) a percentage of computing devices within the plurality of computing devices that have removed the first startup item from their boot sequence, and/or 3) a percentage of computing devices within the plurality of computing devices that, after previously removing the first startup item from their boot sequence, have restored the first startup item to their boot sequence.

In some examples, the request may comprise a unique identifier for the requesting computing device, a unique identifier for the startup item, an operating system of the requesting computing device, an operating-system service pack of the requesting computing device, and/or any other potentially relevant information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing recommendations to improve boot performance based on community data, at least a portion of the method being performed by a computing device comprising at least one processor, the method comprising:
    identifying at least one startup item on the computing device that is scheduled to run at boot time;
    requesting startup-recommendation information for the startup item from a server;
    receiving the startup-recommendation information for the startup item from the server, wherein the startup-recommendation information is based on data gathered from a community of users and comprises information that identifies a percentage of users within the community that, after previously removing the startup item from their boot sequence, have restored the startup item to their boot sequence;
    presenting the startup-recommendation information for the startup item to a user.

2. The method of claim 1, wherein the startup item comprises:
    an application;
    a service.

3. The method of claim 1, wherein presenting the startup-recommendation information comprises displaying the startup-recommendation information in a graphical user interface.

4. The method of claim 3, wherein displaying the startup-recommendation information in the graphical user interface comprises displaying at least one of:
    graphics-based recommendation information for the startup item;
    text-based recommendation information for the startup item.

5. The method of claim 1, wherein the startup-recommendation information further comprises information that identifies at least one of:
    a percentage of users within the community that have the startup item in their boot sequence;
    a percentage of users within the community that have removed the startup item from their boot sequence.

6. The method of claim 3, further comprising receiving, via the graphical user interface, at least one of:
    a user-generated request to remove at least one startup item from the computing device's boot sequence;
    a user-generated request to restore at least one previously removed startup item to the computing device's boot sequence.

7. The method of claim 1, wherein identifying at least one startup item on the computing device that is scheduled to run at boot time comprises:
    identifying each startup item on the computing device that is scheduled to run at boot time;
    creating a startup list that identifies each startup item on the computing device that is scheduled to run at boot time.

8. The method of claim 7, wherein the startup list comprises:
    a unique identifier for the computing device;
    a unique identifier for each startup item.

9. The method of claim 8, wherein the startup list further identifies:
    an operating system of the computing device;
    an operating-system service pack of the computing device.

10. The method of claim 7, further comprising transmitting the startup list to the server.

11. The method of claim 10, further comprising:
    detecting changes to the startup list;
    transmitting, to the server, information that details the changes to the startup list.

12. The method of claim 1, wherein the community comprises a plurality of computing devices having at least one of:
- a common operating system;
- a common operating-system service pack;
- substantially similar hardware components.

13. A computer-implemented method for providing recommendations to improve boot performance based on community data, at least a portion of the method being performed by a server comprising at least one processor, the method comprising:
- obtaining, from a plurality of computing devices within a community, startup information for at least one startup item that is typically scheduled to run at boot time;
- receiving, from a requesting computing device, a request for startup-recommendation information for the startup item;
- generating the startup-recommendation information for the startup item based on the startup information obtained from the plurality of computing devices within the community, wherein the startup-recommendation information comprises information that identifies a percentage of computing devices within the plurality of computing devices that, after previously removing the startup item from their boot sequence, have restored the startup item to their boot sequence;
- transmitting the startup-recommendation information to the requesting computing device.

14. The method of claim 13, wherein obtaining the startup information for the startup item comprises receiving, from each of the plurality of computing devices, a startup list that identifies each startup item that is scheduled to run at boot time.

15. The method of claim 14, wherein obtaining the startup information for the startup item further comprises receiving, from at least one of the plurality of computing devices, information that details changes to the startup list.

16. The method of claim 13, wherein the startup-recommendation information further comprises information that identifies at least one of:
- a percentage of computing devices within the plurality of computing devices that have the first startup item in their boot sequence;
- a percentage of computing devices within the plurality of computing devices that have removed the first startup item from their boot sequence.

17. The method of claim 13, wherein the request comprises at least one of:
- a unique identifier for the requesting computing device;
- a unique identifier for the startup item;
- an operating system of the requesting computing device;
- an operating-system service pack of the requesting computing device.

18. A system for providing recommendations to improve boot performance using community data, the system comprising:
- a data-collection module programmed to identify at least one startup item on a computing device that is scheduled to run at boot time;
- a communication module programmed to:
  - request startup-recommendation information for the startup item from a server;
  - receive startup-recommendation information for the startup item from the server, wherein the startup-recommendation information is based on data gathered from a community of users and comprises information that identifies a percentage of users within the community that, after previously removing the startup item from their boot sequence, have restored the startup item to their boot sequence;
- a startup-manager module programmed to present the startup-recommendation information to a user;
- at least one processor configured to execute the data-collection module, the communication module, and the startup-manager module.

19. The system of claim 18, wherein:
the data-collection module is further programmed to:
- identify each startup item on the computing device that is scheduled to run at boot time;
- create a startup list that identifies each startup item on the computing device that is scheduled to run at boot time;

the communication module is further configured to transmit the startup list to the server.

20. The system of claim 19, wherein:
- the data-collection component is further programmed to detect changes to the startup list;
- the communication module is further programmed to transmit, to the server, information that details the changes to the startup list.

* * * * *